O. L. OLSON.

CHECK ROW POTATO PLANTER.

APPLICATION FILED NOV. 19, 1917.

Reissued Jan. 15, 1918.

14,422.

2 SHEETS—SHEET 1.

WITNESSES:
B. F. Hall
G. E. Sorensen

INVENTOR:
OSCAR L. OLSON.
BY
Paul Hall
ATTORNEYS.

O. L. OLSON.

CHECK ROW POTATO PLANTER.

APPLICATION FILED NOV. 19, 1917.

Reissued Jan. 15, 1918.

14,422.

2 SHEETS—SHEET 2.

WITNESSES:
B. G. McCall
J. E. Sorensen

INVENTOR:
OSCAR L. OLSON.
BY Pierce & Pierce
ATTORNEYS.

UNITED STATES PATENT OFFICE.

OSCAR L. OLSON, OF ST. PAUL, MINNESOTA, ASSIGNOR OF ONE-HALF TO FRANK H. DOUTHITT, OF CLINTON, IOWA, AND ONE-HALF TO ANTON E. SODERLIND, OF BRAHAM, MINNESOTA.

CHECK-ROW POTATO-PLANTER.

14,422. Specification of Reissued Letters Patent. Reissued Jan. 15, 1918.

Original No. 1,203,393, dated October 31, 1916, Serial No. 107,222, filed July 3, 1916. Application for reissue filed November 19, 1917. Serial No. 202,860.

*To all whom it may concern:*

Be it known that I, OSCAR L. OLSON, a citizen of the United States, resident of St. Paul, in the county of Ramsey, State of Minnesota, have invented certain new and useful Improvements in Check-Row Potato-Planters, of which the following is a specification.

This invention relates to wheel-supported machines for planting potatoes, and the main object is to provide a check rower potato planter which will plant potatoes at desired distances apart in spaced rows without missing any hill and without planting more than one potato in each hill.

In the accompanying drawings.

Figure 1:
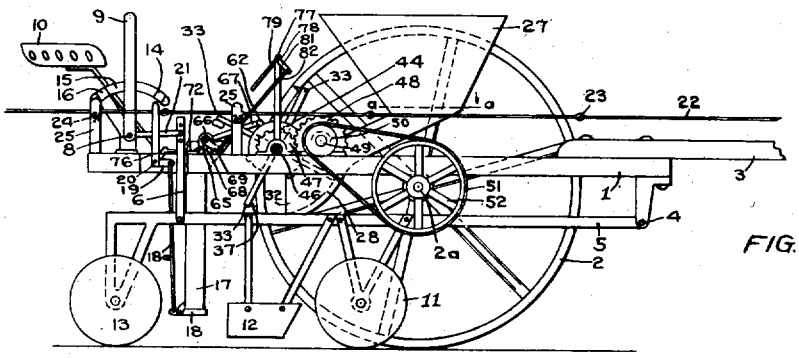
Figure 1 is a side elevation of the improved potato planter with one of its ground wheels removed and the portion of the frame bounded by the line *a—b—c—d—e* in Fig. 2 broken away; owing to limited space of the drawing some parts are imperfectly shown but will be found more clearly shown in other views.

Referring to the drawing by reference numerals, 1 designates the body or main frame of the machine, which is supported by a pair of side wheels 2 and provided with a draft pole 3 to which horses or other motive power may be attached. Pivoted with its forward end at 4 is a substantially central longitudinal bar 5, whose rear portion is connected by a link 6 to a rocker arm 7 of a short rock-shaft 8, which is mounted on the frame and provided with a hand-lever 9 near the operator's seat 10. From said bar 5 depends a pair of furrow-opening disks 11, and rearward thereof a V-shaped furrow opener 12 (shown in Fig. 1) and still farther back a pair of furrow-closing disks 13. Said furrow opening and closing devices are lowered into the ground by moving the hand lever 9 into the notch 14 of a fixed sector 15, and by bringing the lever into the rear notch 16 of the sector the furrow-working devices are raised high enough above the ground to permit the machine to be driven idle over the field.

Figure 2:
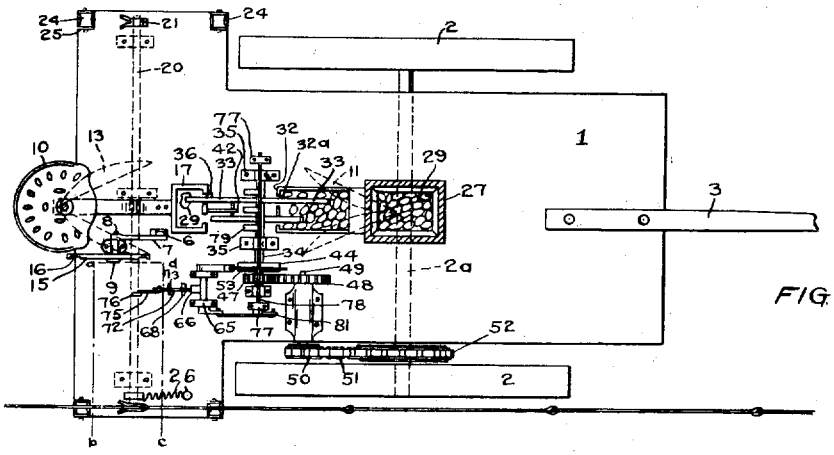
Fig. 2 is a top or plan view of Fig. 1, with the hopper intersected on the line *a—a* in Fig. 1.

Suspended from the main frame and extending also partly above the same, is a potato dropping tube 17, having its lower end arranged in rear of the furrow opener 12 and provided with a pivoted valve 18 operated by a rod 18ª and a rocker arm 19, (see Fig. 5) the latter being fixed on a rock shaft 20 which is journaled across the frame and provided with two forks 21, one near each side of the machine, said forks being adapted for operation by a check line 22 having obstructions 23 engaging the fork at one side of the machine to tilt it when the machine is driven in one direction over a potato field, and to operate the other fork when the machine is driven in the reverse direction. The check line is supported on rollers 24 in posts 25, where it is kept by a cover (not shown) to prevent its accidental escape upward. Every time the forks 21 have been swung rearwardly by an obstruction on the check line, a spring 26 (see Fig. 2) restores them to normal position, thereby closing the valve 18 after a potato has been deposited in the furrow.

Figure 4:
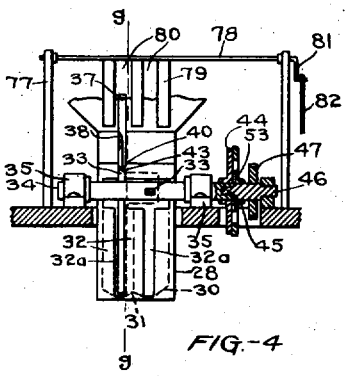
Fig. 4 is a cross section of the machine about as on the line *f—f* in Fig. 3.

The potato-carrying mechanism consists of a hopper or magazine 27 having a segmental downward extension 28, into which the potatoes 29 are gradually moved by their own weight. The bottom of said extension presents two parallel curved segmental grooves 30 (see Fig. 4) with an intermediate ridge 31. The rear end wall 32 of said extension is formed with two deep notches or slits 32ª, inward through which move four radial arms 33, which are fixed on a shaft 34 rotated in bearings 35. The arms 33 are arranged in pairs operating one pair in each notch 32ª and swinging into similar notches 36 in the dropping tube 17; each pair has its two members extended in diametrically opposite directions and provided with a sharp prong 37 by which to impale and carry one potato at a time from the hopper extension into the dropping tube. When the potato is in a position to be dropped into the tube 17 it is pushed off from the prong 37 by a stripper lever 38, which is pivoted to a lug 39 of the arm and has its inner and curved end 40 so arranged that it passes into contact with a stud 41 fixed in a flat bracket 42, secured on the dropping tube; each side of the bracket is provided with such a stud, one stud serving to actuate each pair of stripping levers. 43 are clearings in the arms 33 for the cam-shaped parts 40 of the stripping levers. It is of course understood that when each stripping lever has stripped the potato from the prong it passes by the stud 41 and is free to be depressed against the arm by the next potato into which the prong is forced.

Figure 7:
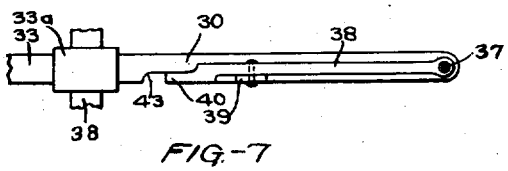
Fig. 7 is a detail face view of one of the potato carrying arms and the hub and shaft carrying it.

The arms 33 may be fixed in a hub like 33[a] in Fig. 7, and may then be termed a spider fixed on a spider shaft 34. Said shaft is provided with a disk-like clutch member 44 (best known in Figs. 5, 6 and 4) and has one end formed with a cavity in which is journaled the end 45 of an abutting short shaft 46, on which is fixed a gear 47, driven by a gear 48, which is fixed on a countershaft 49 having a sprocket 50 driven by a chain 51 and a sprocket 52, the latter being fixed either to one of the ground wheels 2 or to the axle 2[a] thereof if the latter is made rotatable in its bearings.

On the short shaft 46 is fixed a ratchet wheel 53 (best shown in Fig. 5) which acts as a second clutch member by engaging a dog 54 pivoted at 55 to the clutch member 44. Said dog is provided with a tail 56, having a notch 57 in which engages a tooth 58 of a ring 59, which has a slight rotary movement about its center, it having slots 60 loosely engaged by headed studs 61 secured in the member 44. Said ring is provided with four radial fingers 62. A spring 63 serves to hold the ring normally in position shown so that the dog 54 engages the ratchet wheel.

Journaled in bearings 65 is a short rock shaft 66 having three radial arms 67, 68, 69. The arms 68 receive motion from the end of a push piece 70 which is pivoted at 71 to a bar 72 sliding in bearings 73 and having a spring 74 raising the push piece 70 into engagement with and allowing it to be retracted below the arm 68. Said slide 72 is connected by a link 75 to a rocker arm 76 on the fork shaft 20, so that each time the forks 21 are swung forward by the spring 26 the push piece 70 causes the arm 67 to swing beyond the ends of the fingers 62, whereupon the spring 63 rotates the ring 59, and as the dog is thereby engaged in the ratchet wheel the latter, which is constantly rotated as long as the machine is in motion, rotates the clutch member 44 and thereby the spider 33 until one potato has been carried into the dropping tube 17, when the spider shaft is uncoupled by the following mechanism: Mounted in posts 77 is a light rock shaft 78 having a depending wing 79 with two slots 80 in it (see Fig. 4) and at one end of the shaft is a rocker arm 81 connected by a link rod 82 to the arm 69 on shaft 66. (See Figs. 5, 1 and 2.)

Figure 3:
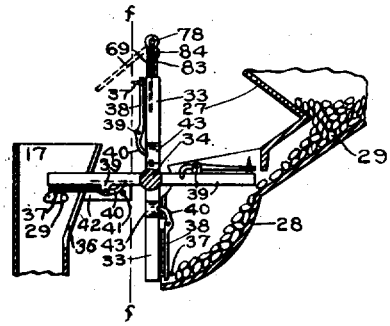
Fig. 3 is a partly sectional view of an enlarged portion of Fig. 1 about as on the line *g—g* in Fig. 4.

In Fig. 3 it will be seen that the shaft 78 is friction held against accidental rotation by having the upper part of one of its bearing posts split at 83 and provided with a clamping screw 84 arranged to draw the split portion against the shaft with any desired tension.

Figure 5:
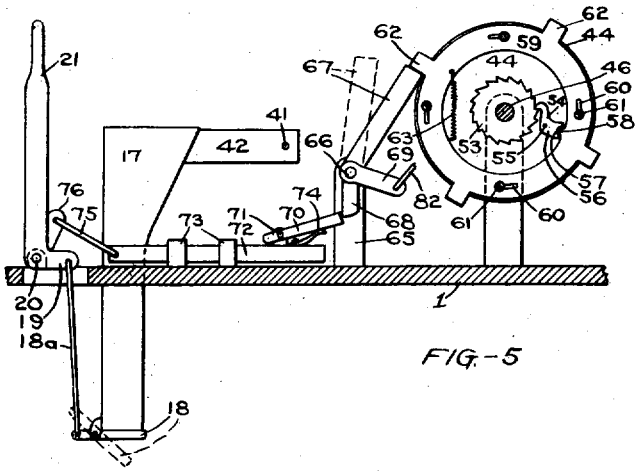
Fig. 5 is an enlarged partly sectional view, showing more clearly the clutch mechanism and its relation to the dropping tube and check rower fork; in this view the shaft 34 is intersected on the line *g—g* Fig. 6.
Figure 6:
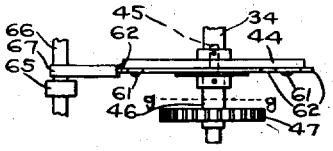
Fig. 6 is a top view of the portion of Fig. 5 above it with the gear 47 added.

The operation of the machine is as follows: Assuming that the hills are to be three feet apart and that forward movement of the machine will cause a complete revolution of the potato pick-up device, then it will be evident that if there are four arms to this pick-up device there will be four chances that a potato will be picked up for delivery to the dropper tube between each hill. Through the clutch mechanism described the potato pick-up arms will continue to revolve until a potato has been gathered up and engages the wings 79. Thereupon the shaft 78 will be rocked and downward thrust will be imparted to the rod 82 and the arm 67 will be moved from the dotted line position shown in Fig. 5 to the full line position shown in the same figure into the path of one of the fingers 62 to check the revolution of the clutch member 44. At this time the parts will be in the position as shown in Fig. 5 and upon the engagement of the arm 67 with the finger 62 the member 44 will be rotated a distance equal to the length of the slots 60 and the spring 63 will be put under tension and sufficient movement of the dog 54 will be permitted to allow its disengagement from the ratchet wheel 53, one end of the dog 54 being held by engagement of the tooth 58 with the notched end 57 of said dog. Thus the clutch member will be released and the shaft 46 and the ratchet wheel will be free to revolve as the machine moves ahead, while the potato pick-up mechanism and its driving connection are temporarily stationary. This tripping of the clutch mechanism will only take place when a potato has been gathered up and deposited in the dropper tube. The machine having reached the hill, the checker line will trip the member 21 and open the valve in the lower end of the dropper tube through the mechanism shown in Fig. 5. Upon the disengagement of the checker line from the fork 21 the spring 26 will restore the fork to its normal position and close the valve in the dropper tube and thrust the bar 72 forward with sufficient force to trip the arm 67 through the engagement of the push piece 70 with the arm 68. The spring 63 will then return the member 44 to its normal position, the dog 54 will again engage the ratchet wheel 53 to again start the revolution of the pick-up arms and repeat the above-described operation.

It will be noted from the foregoing that with the number of pick-up arms shown the chance of all of them missing the potatoes or failing to pick up one will be very slight. The pick-up device will continue to revolve until a potato is gathered up, the mechanism in the path of a potato carried by one of the arms releasing the clutch mechanism and temporarily stopping the revolution of the pick-up device. When the valve in the dropper tube is opened by the obstruction of the checker line, the potato will be discharged into the hill, the valve will immediately close and the release of the checker line from the fork will allow its actuating spring to disengage the pick-up device checking means and allow its operating means to again become active and again revolve the pick-up device to resume the gathering up of the potatoes. The delivery of a potato to the dropper tube between every hill is thereby practically assured.

I claim as my invention:

1. In a potato planter, the combination with a pair of ground wheels, of a frame carried thereby and having a draft pole, furrow opening means and furrow closing means carried by the same, means for adjusting said furrow working devices into and upward above the ground, a potato dropping tube carried by the frame and having in its lower end a valve, a potato magazine having an upwardly open extension with slits in the walls nearest the dropping tube, a spider mounted to rotate near said slits and having arms swinging through the slits and provided each with a sharp prong by which to engage a potato and carry it into the dropping tube, means for automatically disengaging each potato from the arm into the tube, operative connection between said spider and one or both of the ground wheels to rotate the spider normally at a superfluous speed, a coupling device inserted in the operative connection, a trigger controlling the coupling mechanism and arranged to be operated by each potato passing to the dropping tube, so as to prevent more than one potato from being dropped at one time by the tube, a check rower mechanism arranged to operate the valve, a spring restoring the check rower mechanism to normal position after each potato is dropped, operative connection between said spring and the valve and the trigger to restore them automatically to normal position after each potato is dropped into the furrow.

2. In a potato planter, a dropping tube designed to drop one potato at a time into the ground, a valve controlling the lower end of said tube, means for opening the valve automatically at certain predetermined spaced points in the travel of the planter, a wheel carrying potatoes one by one from a supply toward the tube faster than the tube is supposed to drop them, means for driving said wheel, and automatic means for uncoupling it by each potato actually carried into the tube, and automatic means for coupling the wheel again to its driving means as soon as the dropping tube is emptied.

3. In a potato planter, a dropper tube, a member mounted to deliver potatoes one by one thereto, an operating means for said member, mechanism actuated through the carrying of a potato by said member to said tube for checking temporarily the movement of said member, and means for releasing said member to resume its operation when the potato so delivered to said tube has been discharged.

4. In a potato planter, a potato delivering device and means for controlling the discharge of potatoes therefrom, a pick-up member mounted to deliver the potatoes one by one to said device, means for operating said member until a potato has been picked up, mechanism operated by the carrying of a potato to said device for temporarily checking the movement of said member, and means for operating the controlling means of said delivering device to discharge the potato therein and simultaneously releasing said member to resume its potato pick-up operation.

5. In a potato planter, a potato dropping tube and valve therefor, a potato delivering member having pick-up arms for gathering the potatoes one by one for delivery to said tube, means for operating said member, means actuated through the gathering up of a potato for disengaging the operating mechanism of said member to temporarily stop it, a checker line and means actuated by said line for opening said valve and reëngaging said operating mechanism with said delivering member when the potato has been dropped from said tube.

6. In a potato planter, a dropping tube, a device for delivering potatoes to said tube, said device being mounted to revolve and having a plurality of potato pickers, a clutch mechanism for controlling said device, mechanism actuated through the delivery of a potato to said tube for releasing said clutch mechanism and checking the movement of said device temporarily, and means for discharging the potatoes one by one from said tube.

7. In a potato planter, a hopper, a revolving pick-up device having a plurality of arms operating in said hopper to pick-up the potatoes one by one, an operating means for said device, means in the path of a potato gathered up by one of said arms for disengaging said operating means and temporarily checking said device and means for reëngaging said device with said operating means when the potato has been discharged, the operation of said device continuing until one of its arms picks up a potato.

In witness whereof, I have hereunto set my hand this 3d day of November, 1917.

OSCAR L. OLSON.

Witnesses:
CHAS. D. MORELL,
M. R. OSTROM.

Copies of this patent may be obtained for five cents each, by addressing the "Commissioner of Patents, Washington, D. C."